US007134095B1

(12) United States Patent
Smith et al.

(10) Patent No.: US 7,134,095 B1
(45) Date of Patent: Nov. 7, 2006

(54) SIMULATED THREE-DIMENSIONAL NAVIGATIONAL MENU SYSTEM

(75) Inventors: Kim C. Smith, Colleyville, TX (US); Theodore David Wugofski, Fort Worth, TX (US); Michael Mostyn, Flower Mound, TX (US); Thomas A. Kayl, Sioux City, IA (US)

(73) Assignee: Gateway, Inc., Irvine, CA (US)

( * ) Notice: Subject to any disclaimer, the term of this patent is extended or adjusted under 35 U.S.C. 154(b) by 1004 days.

(21) Appl. No.: 09/421,580

(22) Filed: Oct. 20, 1999

(51) Int. Cl.
*G06F 3/00* (2006.01)

(52) U.S. Cl. .................. 715/860; 715/859; 715/861; 715/848; 715/850; 715/649; 715/852

(58) Field of Classification Search .......... 345/856, 345/649, 157, 160, 859, 860, 861, 655, 679, 345/848, 850, 852, 642, 653, 767, 836, 473, 345/977
See application file for complete search history.

(56) References Cited

U.S. PATENT DOCUMENTS

| 4,766,423 A | 8/1988 | Ono et al. ............. 340/709 |
| 5,257,349 A | 10/1993 | Alexander ............. 395/159 |
| 5,295,243 A * | 3/1994 | Robertson et al. ...... 345/700 |
| 5,303,388 A * | 4/1994 | Kreitman et al. ....... 345/159 |
| 5,339,390 A | 8/1994 | Robertson et al. ...... 395/157 |
| 5,404,440 A | 4/1995 | Asahi .................. 395/155 |
| 5,436,637 A | 7/1995 | Gayraud et al. ........ 345/116 |
| 5,452,414 A | 9/1995 | Rosendahl et al. ...... 395/159 |
| 5,485,197 A | 1/1996 | Hoarty ................. 348/7 |
| 5,528,735 A | 6/1996 | Strasnick et al. ....... 395/127 |
| 5,546,528 A | 8/1996 | Johnston .............. 395/159 |
| 5,555,345 A | 9/1996 | Komori et al. .......... 395/23 |
| 5,555,354 A | 9/1996 | Strasnick et al. ....... 395/127 |
| 5,638,523 A | 6/1997 | Mullet et al. .......... 395/326 |
| 5,671,381 A | 9/1997 | Strasnick et al. ....... 395/355 |
| 5,678,015 A | 10/1997 | Goh .................... 395/355 |
| 5,704,051 A | 12/1997 | Lane et al. ............ 395/357 |
| 5,724,492 A * | 3/1998 | Matthews, III et al. ... 345/119 |
| 5,729,673 A | 3/1998 | Cooper et al. .......... 395/127 |
| 5,742,779 A | 4/1998 | Steele et al. .......... 345/349 |
| 5,745,111 A | 4/1998 | Cline et al. ........... 345/348 |
| 5,748,927 A | 5/1998 | Stein et al. ........... 395/333 |
| 5,767,854 A | 6/1998 | Anwar ................. 345/355 |
| 5,801,704 A | 9/1998 | Oohara et al. .......... 345/358 |
| 5,801,707 A | 9/1998 | Rolnik et al. .......... 345/429 |
| 5,898,432 A | 4/1999 | Pinard ................. 345/334 |
| 5,926,179 A * | 7/1999 | Matsuda et al. ......... 345/744 |

(Continued)

OTHER PUBLICATIONS 2003-487889, Derwent.*

*Primary Examiner*—Weilun Lo
*Assistant Examiner*—Mylinh Tran
(74) *Attorney, Agent, or Firm*—Suiter West Swantz PC LLO

(57) ABSTRACT

A user interface, system, method and software for displaying a simulated three-dimensional display of menu options to a user, thereby maximizing use of a display's real estate by presenting all available options at once while at the same time presenting certain options in a more pronounced manner. The system monitors for running applications, polls the running applications for any available options, and displays the options in the simulated three-dimensional format. With this type of dynamic menu, standard means for bringing focus to a selectable target create complexities, and are thus avoided by designing the system's cursor to duplicate the appearance of the selected target's shape, preferably in a smaller size.

76 Claims, 12 Drawing Sheets

U.S. PATENT DOCUMENTS

| | | | |
|---|---|---|---|
| 6,078,935 A | * | 6/2000 | Nielsen ....................... 707/513 |
| 6,160,539 A | * | 12/2000 | Fleck ......................... 345/173 |
| 6,236,389 B1 | * | 5/2001 | Imaizumi et al. ........... 345/145 |
| 6,329,978 B1 | * | 12/2001 | Yeh et al. ................... 345/157 |
| 6,628,313 B1 | * | 9/2003 | Minakuchi et al. ......... 345/853 |

* cited by examiner

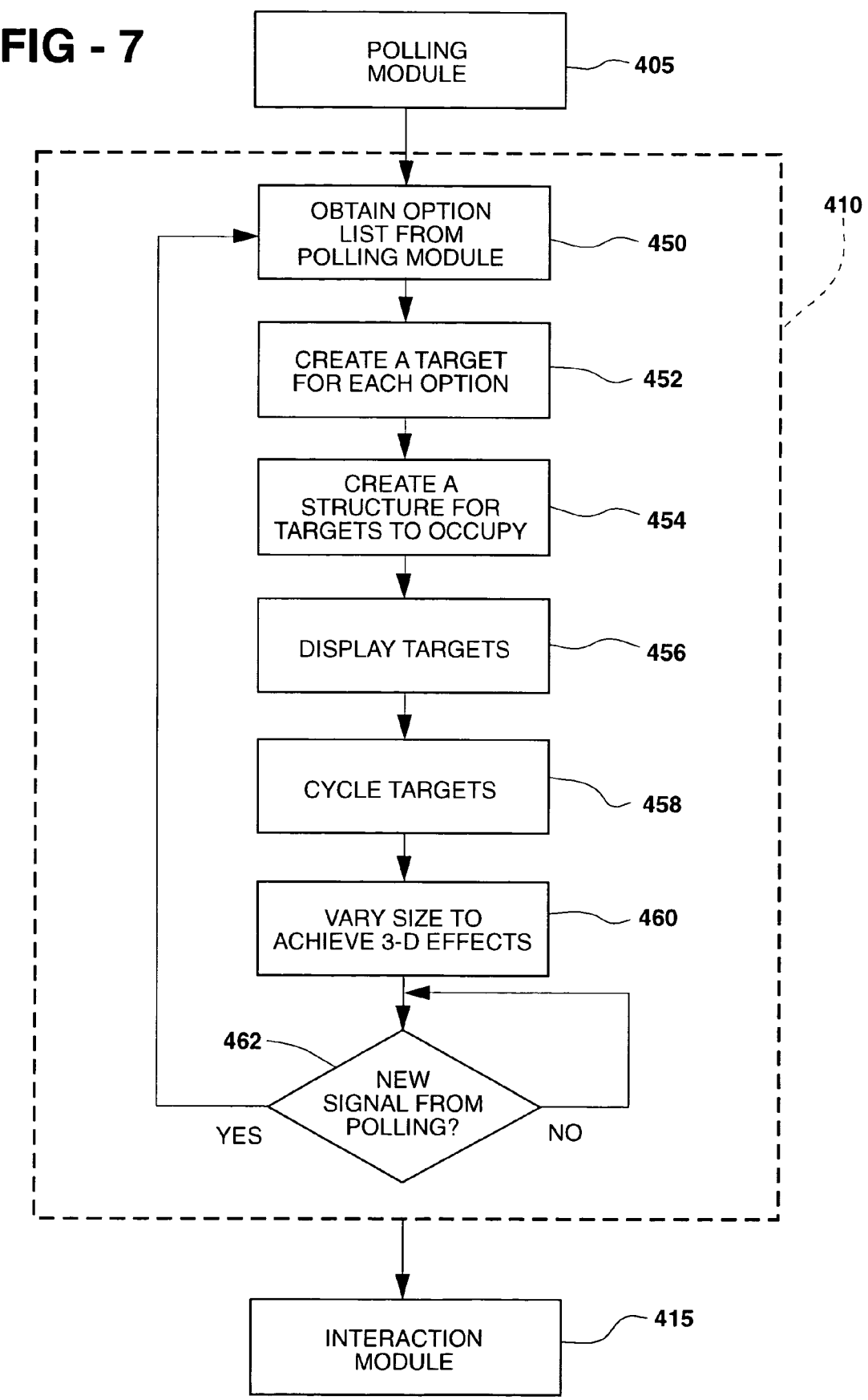

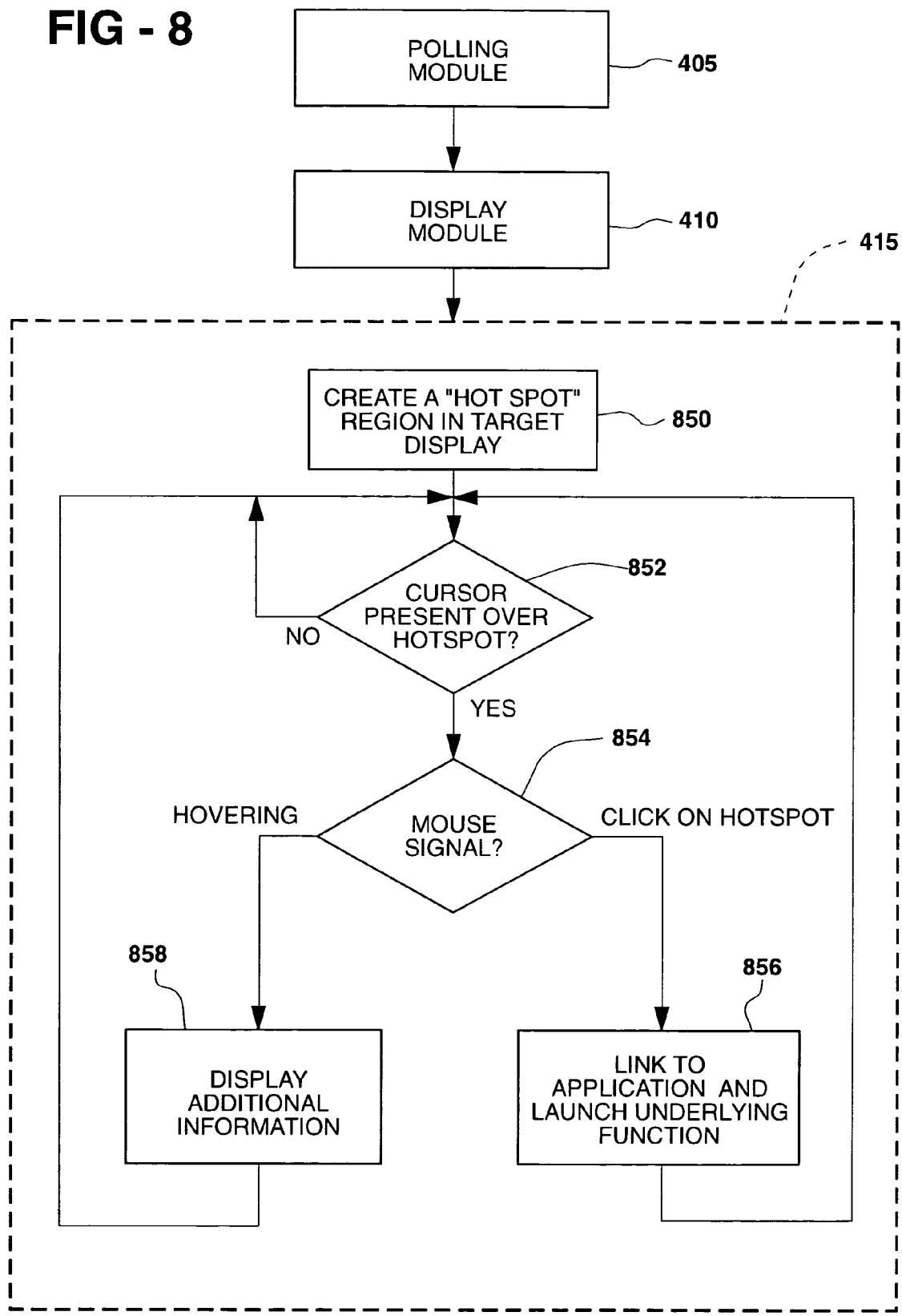

SIMULATED THREE-DIMENSIONAL NAVIGATIONAL MENU SYSTEM

FIELD OF THE INVENTION

This invention relates generally to option display systems and more particularly to automated option display systems.

BACKGROUND OF THE INVENTION

Today, computers are drastically more complex than the computers from a year ago. With this growth in hardware complexity has been an equal, if not greater, growth in software complexity. By being able to build onto previously developed applications, software designers have been able to easily increase the number of options available from any given application.

The problem with this advancement in software is that trying to gain access to, or become aware of, all the options available to a user is nearly impossible unless the user has some prior knowledge. With computer display space at a premium, many software developers include these expanded features into hierarchical menus that many users, especially novice users, liken to a maze. Other software developers attempt to give the user a display of all the available options by creating a multitude of icons representing each option. The problem with this method is that as these options, and their corresponding icons, grow in number, display space remains limited. A desktop with too many icons creates a disorganized and difficult-to-decipher workspace. One could simply make the icons smaller. However, that would limit their ability to convey their presence to a user, not to mention make them more difficult to read, move, or select.

The utility that has spawned the popularity of computers today is the graphical user interface, or GUI. As is well known, GUIs offer the user an array of options, typically in the form of icons, which are selected and the underlying applications executed with the aid of a cursor controlled by a pointing device such as a mouse. In many GUIs today, there is such a myriad of graphics and text that it is easy to become confused as to what are selectable options that can be executed, and what are just images placed in the display to make the operating environment more appealing to the eye. To overcome this confusion, many cursors have a function integrated into them that will present a response when the cursor is in contact with an option that is selectable. The cursor in these systems will not respond if the user moves the cursor over an object that is displayed merely for looks. A typical response from the cursor to identify these selectable options, or hotspots, is to highlight the object by making it darker, brighter, larger, or sometimes by making it move. Although this helps the user to a certain extent, there remains a problem with newer, more advanced GUI technology.

With the advent of animated menus, the user can now see a myriad of options scrolling or spinning within the display. This method of displaying enables a GUI to present more options to a user while occupying only a small amount of display space real estate. The constant motion, changing of shape, and changing of size of these selectable targets also presents a problem for the conventional methods of target highlighting mentioned above. To configure the animated display to further change the appearance of the moving targets in the presence of a cursor would be very problematic, if not impossible. However, there is another way for these GUIs to be further enhanced.

While highlighting and presenting dialog boxes can be helpful to a user to a certain extent, a more informative and indicative highlighting operation is possible. By allowing the cursor to change shapes in response to the cursor, either at rest or in motion, being present on a hotspot or selectable option, the user interface and the included moving display can be made more helpful and informative. To further enhance this change of cursor utility, one could configure the cursor's change in such a way that the reshaped cursor is actually a miniature representation of the original hotspot over which the cursor is hovering.

Accordingly, what is needed is: an option display system that allows large quantities of options to be displayed while requiring a minimal amount of display space real estate, an option display system that systematically presents options to a user without any interaction, an option display system that maintains the most current available options in view of a user, an option display system that can provide additional information upon request about a displayed option, an option display system capable of clearly indicating a cursor's contact with a selectable option, and an option display system that incorporates all of the above and still allows the user to utilize the remainder of the display space to operate other applications.

SUMMARY OF THE INVENTION

Accordingly, the present invention provides a user interface comprising a display, a cursor displayed on the display, a cursor control device configured to control the cursor on the display, one or more targets displayed on at least a portion of the display, at least one axis wherein the targets are configured to cycle about the axis, and wherein the targets are further configured such that at least one of the targets is continuously accessible as the targets cycle about the axis.

The present invention also provides a system comprising at least one processor, memory operably associated with the processor, and a user interface comprising a display, a cursor displayed on the display, a cursor control device configured to control the cursor on the display, one or more targets displayed on at least a portion of the display, at least one axis wherein the targets are configured to cycle about the axis, and wherein the targets are further configured such that at least one of the targets is continuously accessible as the targets cycle about the axis.

The present invention also provides a computer readable medium tangibly embodying a program of instructions implementing displaying one or more targets on at least a portion of a display, cycling the one or more targets about at least one axis, and wherein configuring the targets such that at least one of the targets is continuously accessible as the targets cycle about the axis.

The present invention further provides a method implementing displaying one or more targets on at least a portion of a display, cycling the targets about at least one axis, and wherein configuring the targets such that at least one of the targets is continuously accessible as the targets cycle about the axis.

The present invention further provides a signal embodied in a propagation medium comprising at least one instruction configured to display one or more targets on at least a portion of a display, at least one instruction configured to cycle the targets about at least one axis on at least a portion of the display, and at least one instruction configured to provide continuous access to at least one target as the target cycles about the axis.

It is an object of the present invention to provide an automated menu of all options available to a user.

It is another object of the present invention to continuously cycle the available options for the user to view and choose.

It is another object of the present invention to maintain the display of available options in the user's view at all times.

It is another object of the present invention to maintain the displayed list of options such that if a user were to change the current environment, the display would be updated with the options available from the current environment.

It is another object of the present invention to provide additional information about the displayed options when the user hovers a cursor over the option in question.

It is an object of the present invention to provide a more informative and useful method of identifying selectable options in a user interface.

It is an object of the present invention to provide a method for changing a cursor's shape to represent the selectable option in contact with the cursor.

The present invention provides the advantage of presenting the user with an indicative representation of selectable options.

The present invention further provides the advantage of changing the shape of a cursor in contact with a selectable option to represent that selectable option.

The present invention provides the advantage of an automated display of available options to a user.

The present invention also provides the advantage of maintaining this display of available options in the user's view at all times.

The present invention further provides the advantage of updating the display of available options to a user whenever the user changes environments.

The present invention further provides the advantage of providing the user with additional information about the displayed options when the user hovers a cursor over the questioned option.

The present invention further provides the advantage of providing this display of options to the user while still allowing the user to utilize the remainder of the display space to operate other applications.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

FIG. 7 is a block diagram illustrating the implementation of a Display Module of FIG. 5 according to a preferred embodiment of the present invention;

FIG. 8 is a block diagram illustrating the implementation of an Interaction Module of FIG. 5 according to a preferred embodiment of the present invention;

DETAILED DESCRIPTION OF A PREFERRED EMBODIMENT OF THE INVENTION

In the following detailed description of preferred embodiments, reference is made to the accompanying drawings that form a part hereof, and in which is shown by way of illustration, specific preferred embodiments in which the invention may be practiced. These embodiments are described in sufficient detail to enable those skilled in the art to practice the invention, and it is to be understood that other embodiments may be utilized, and that logical, mechanical and/or electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
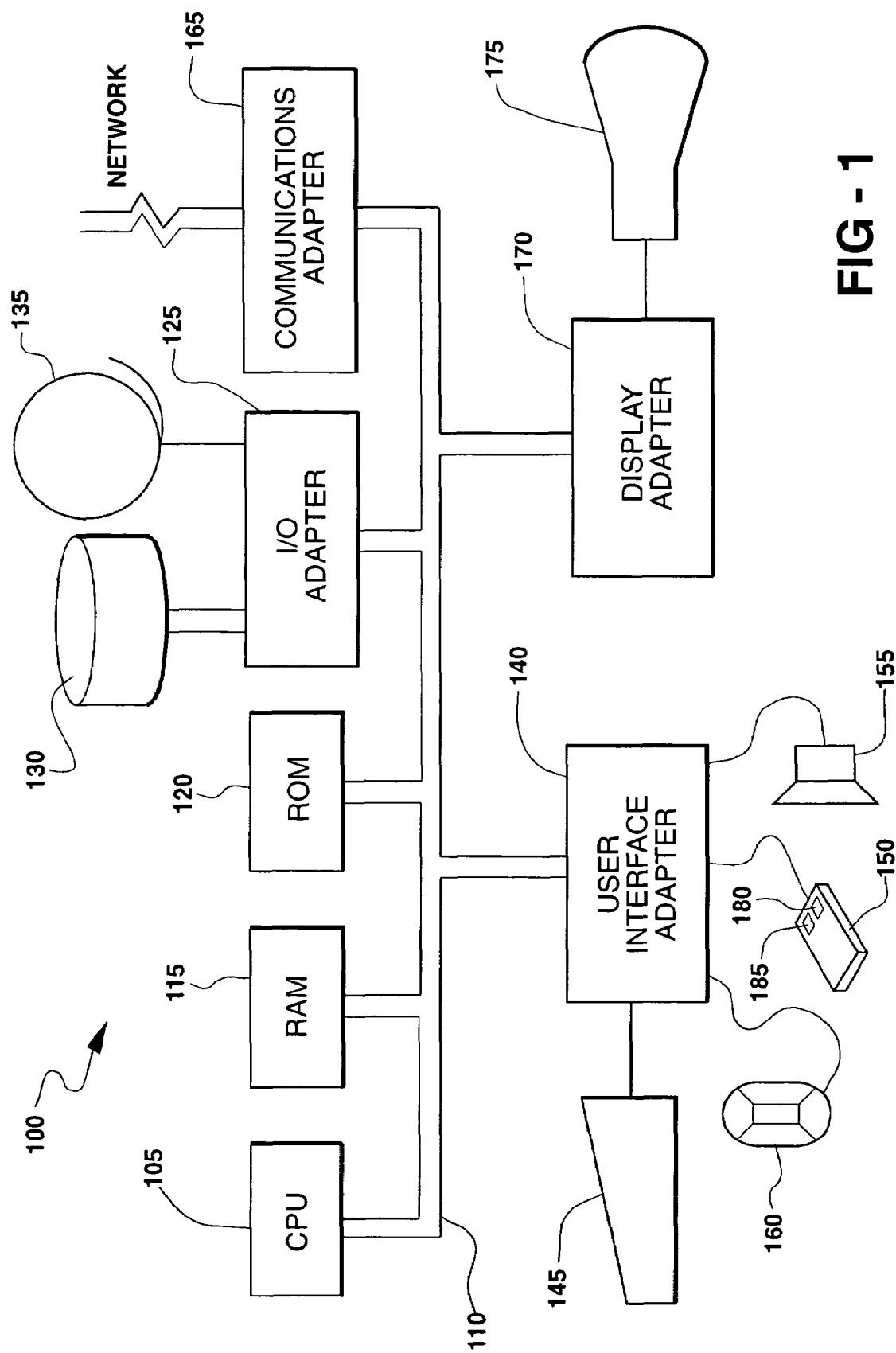
FIG. 1 illustrates a block diagram showing a computer system according to a preferred embodiment of the present invention.

A representative hardware environment for practicing the present invention is depicted in FIG. 1, which illustrates a typical hardware configuration of an information handling system 100 in accordance with the present invention having a central processing unit (CPU) 105 such as a conventional microprocessor and a number of other units interconnected via at least one system bus 110. Information handling system 100 may be, for example, a portable or desktop Gateway computer or a Gateway Destination system (Gateway and Destination are trademarks of Gateway, Inc.). Information handling system 100 shown in FIG. 1 includes random access memory (RAM) 115, read-only memory (ROM) 120 wherein the ROM 120 could also be erasable programmable read-only memory (EPROM) or electrically erasable programmable read-only memory (EEPROM), an input/output (I/O) adapter 125 for connecting peripheral devices such as a disk unit 130 and a tape drive 135 to system bus 110, a user interface adapter 140 for connecting a keyboard 145, a mouse 150, a speaker 155, a microphone 160, and/or other user interface devices to system bus 110, a communications adapter 165 for connecting information handling system 100 to an information network such as the Internet, and a display adapter 170 for connecting system bus 110 to a display device such as a monitor 175. The mouse 150 typically has a first and a second button, 180 and 185 respectively, and is used to control a cursor (not shown) displayed on the monitor 175.

Figure 2:
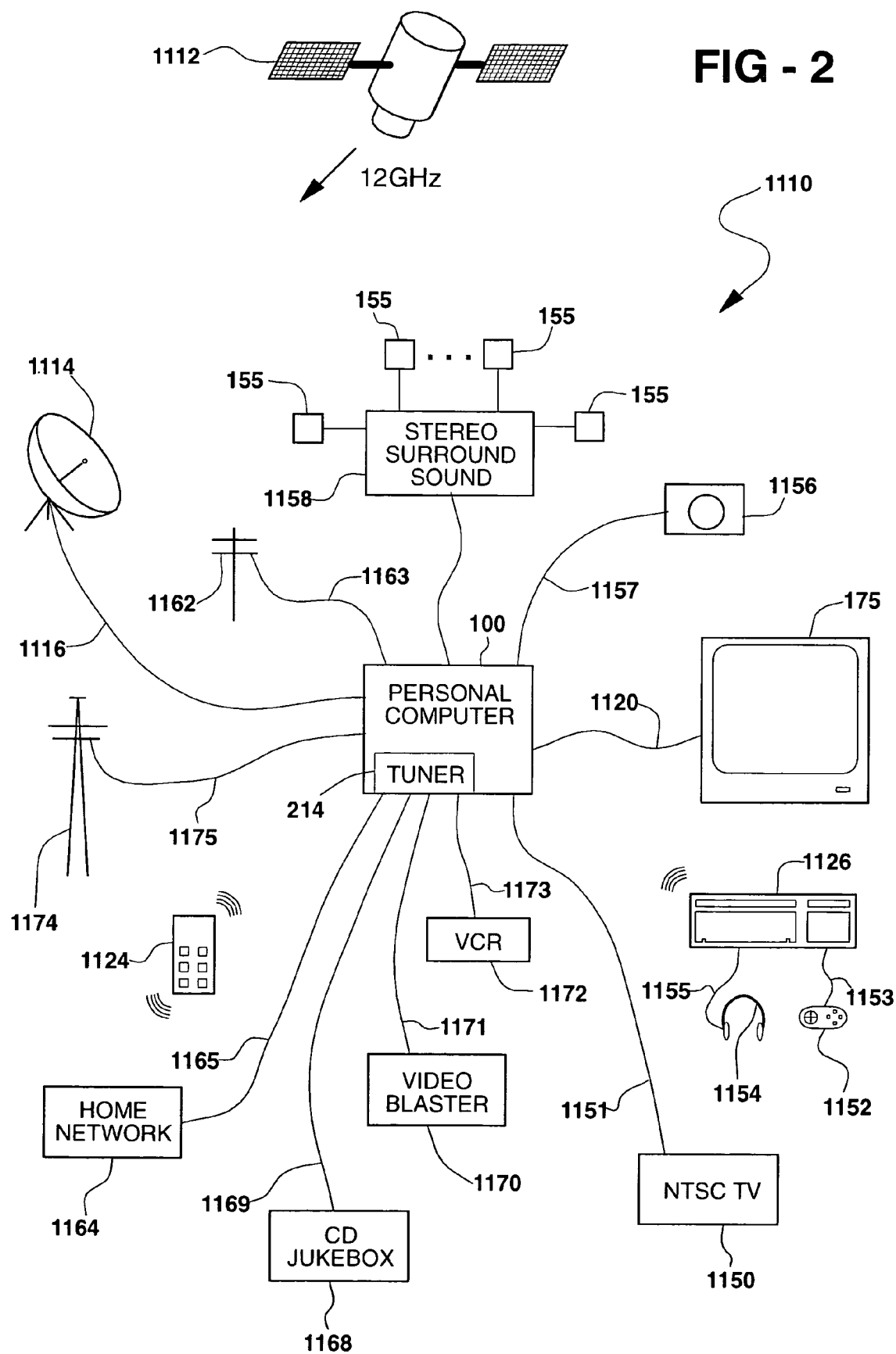
FIG. 2 illustrates a block diagram showing a convergence system according to a preferred embodiment of the present invention.

Referring next to FIG. 2, a home entertainment or convergence system is shown generally at 1110. Reference numerals or letters in FIG. 2 which are like, similar, or identical to the reference numerals or letters of FIG. 1 indicate like, similar, or identical components or features. External to convergence system 1110 is satellite 1112 which in one preferred embodiment is an HS601 model operated by Hughes at a 101 degree west longitude geosynchronous orbital location and transmits signals comprising 150 channels of modulated digital video, audio, and data at a frequency of about 12 GHz. The satellite signals are received by home entertainment system 1110 by antenna 1114 containing a low noise block converter amplifier. Antenna 1114 is preferably about 18 inches in diameter and receives left and right hand circularly polarized signals between 12.2 and 12.7 GHz. Antenna 1114 provides a "downconverted-spectrum" signal between 950 and 1450 MHz via a coaxial cable or other suitable communication medium 1116 to information handling system 100 such as a personal computer or other system or circuitry capable of processing data. Suitable antennas 1114 are already being manufactured and sold by RCA Corporation by direct sales and through numerous major retail chains such as Radio Shack.

System 100 contains circuitry and software to further process signals from the antenna, generally demodulating and decoding the signal to produce a VGA (video graphics adapter) signal. The VGA signal is provided via standard VGA compatible monitor cable 1120 to drive the monitor 175 suitable for viewing in a family room or entertainment room environment. System 100 provides for user input by means of remote controls 1124 and 1126. Remote control 1124 comprises a hand-held size device with standard television controls and a numeric keypad and, in one embodiment, VCR (video cassette recorder) controls and a pointing device. It provides RF (radio frequency) or IR (infrared) control signals received by system 100. Remote control 1126 is a full function personal computer keyboard with additional standard television and VCR controls, a pointing device which is preferably in the form of a touchpad, and it also provides RF control signals to system 100. RF control signals were selected over IR or hardwired in one embodiment due to its benefits in a home entertainment environment. It allows the system to be in a different room from the monitor 175, or if in the same room, a clear line of sight is not required. In another embodiment, IR control signals were selected because of the availability of the standard circuitry at low cost. Monitor cable 1120 is a standard type cable typically used on VGA display devices and comprises up to 15 electrical conductors interfacing with monitor 175 in a D-series shell connector. In one embodiment, full multi-media sourcing and destinationing of audio/video/data (A/V/D) broadcast is provided for. Although the embodiment presented herein discusses the use of VGA signals, it should be mentioned that with an appropriate change in hardware, NTSC signals and NTSC capable hardware can employ the present invention in the manner mentioned herein.

Information handling system 100 may include a tuner 214, tuner circuitry or card, capable of both tuning to multiple channels and receiving television information or signals in the form of the NTSC (National Television Standards Committee) or PAL (Phase Alteration Line) forms from any medium such as from a cable system or from a digital satellite system. One embodiment of signal 1116 from satellite dish 1114 provides digital A/V/D signals from such sources as DirectTV or Primestar (DirectTV and Primestar are trademarks of their respective companies). In another such embodiment, the signal on cable 1116 provides analog A/V such as NTSC antenna signals. In another such embodiment, the signal on cable 1157 from camera 1156 provides analog A/V such as NTSC audio/video signals. In further embodiments, the signal on cable 1175 from cable-data source 1174 provides analog and/or digital A/V/D. In further such embodiments, the signal on cable 1163 from PSTN (Public Switched Telephone Network) 1162 provides data or phone signals such as ISDN (integrated services digital network) or POTS (plain old telephone system) signals. In one set of such embodiments, system 100 is programmed to automatically record analog signals such as television programming onto recordable media such as a video tape in VCR 1172 coupled to cable 1173. In another such set of embodiments, system 100 is programmed to automatically record digital signals such as digital television programming, DVD programming, or CD-ROM (Compact Disk—Read Only Memory) type audio onto recordable media such as recordable compact disks in CD/DVD jukebox 1168 coupled to cable 1169. CD/DVD jukebox 1168 also plays CDs, CD-ROMs, or DVDs for use elsewhere. In another such embodiment, signals are sent to stereo surround sound system 1158 for audio output to one or more speakers 155 and on cable 1151 to TV 1150. In one such embodiment, earphones 1154 on cable 1155 and gamepad 1152 on cable 1153 provide additional input/output through remote control 1126. Home network 1164 is "smart wiring" used to transmit data and control within the home, coupled by cable 1165 to system 100. Videoblaster 1170 provides video signal processing on cable/connector 1171. Cables 1175, 1116, 1163, 1157, 1151, 1173, 1171, 1169, 1155, and 1153 are examples of communications links that can be wired coupling or wireless, such as RF or IR.

One example of convergence system 1110 is the Destination System using the DestiVu user interface manufactured and sold by Gateway, Inc. In this manner, convergence system 1110 is a fully functional computer integrated with a television, providing TV viewing (via broadcast, cable, satellite, VCR, digital disk, or other broadcast media) and personal computing functionality. This convergence of computer and television enables a user the combined access to both television programs and information, computer related functionality such as computer information and programs, and Internet access.

Although many of today's televisions employ much of the same hardware resources employed by computers such as information handling system 100, it is possible that the present invention might be practiced in other electronic devices or networked electronic devices. For example, with the development of audio/video networking such as the recently proposed HAVi standard, television sets or other audio/video devices such as audio/video receivers and VCRs that do not themselves contain such resources could implement the present invention by using the resources of other devices on a network.

Figure 3:
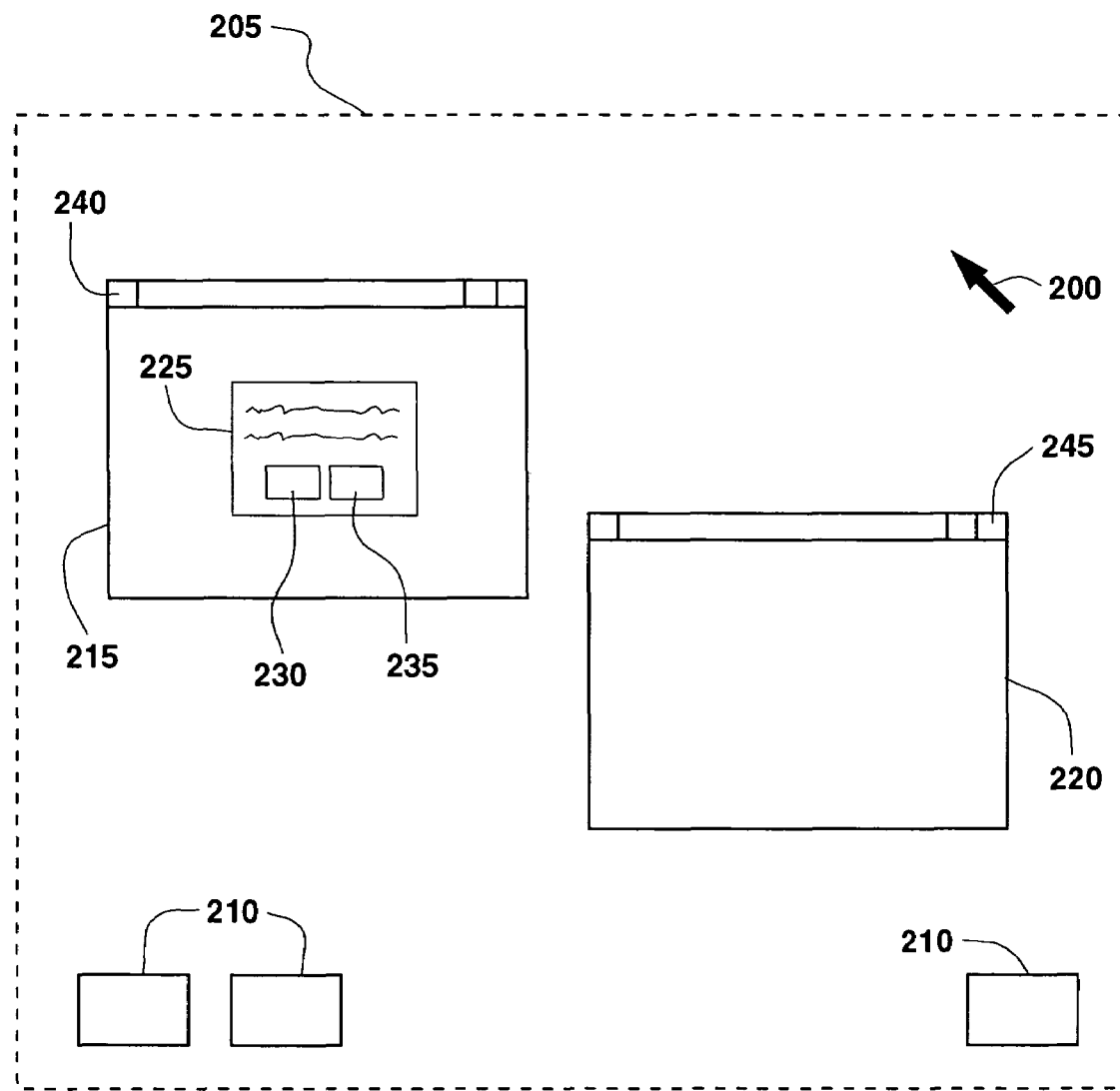
FIG. 3 shows a "desktop" display of a computer operating system, typically employed on the computer system of FIGS. 1 and 2, using a user interface according to a preferred embodiment of the present invention.

Referring next to FIG. 3, a detail of an operating system's user interface as is typically displayed on monitor 175 in accordance with the present invention is illustrated. Reference numerals or letters in FIG. 3 which are like, similar, or identical to the reference numerals or letters of FIGS. 1–2 indicate like, similar, or identical components or features. The operating system shown in FIG. 3 is IBM's OS/2 (OS/2 is a trademark of International Business Machines Corporation). However, the present invention will work with DestiVu, Windows 98, Windows 95 (DestiVu is a trademark of Gateway, Inc. and Windows 98 and Windows 95 are trademarks of Microsoft Corporation), or any other user interface. This user interface includes cursor 200, desktop 205, three icons 210, a first and a second window, 215 and 220 respectively, and dialog box 225. Dialog box 225 further contains a first and a second button, 230 and 235 respectively. Programs are represented by the user interface as either icons 210 or windows 215 or 220. The horizontal region along the top of the first and second windows 215 and 220 are called a first and a second title bar, 240 and 245 respectively. The program window 215 or 220 has the "focus" when it has been designated by the user or by the operating system to receive input from keyboard 145 or mouse 150. In OS/2, the user gives the window focus by clicking a mouse button 180 or 185 when cursor 200 is inside that window. Some operating systems, however, give a window the focus merely whenever cursor 200 is present within that window. The operating system indicates which program has the focus by changing the color of the focused window's title bar 240 or 245, or by some other highlighting action.

Figure 4:
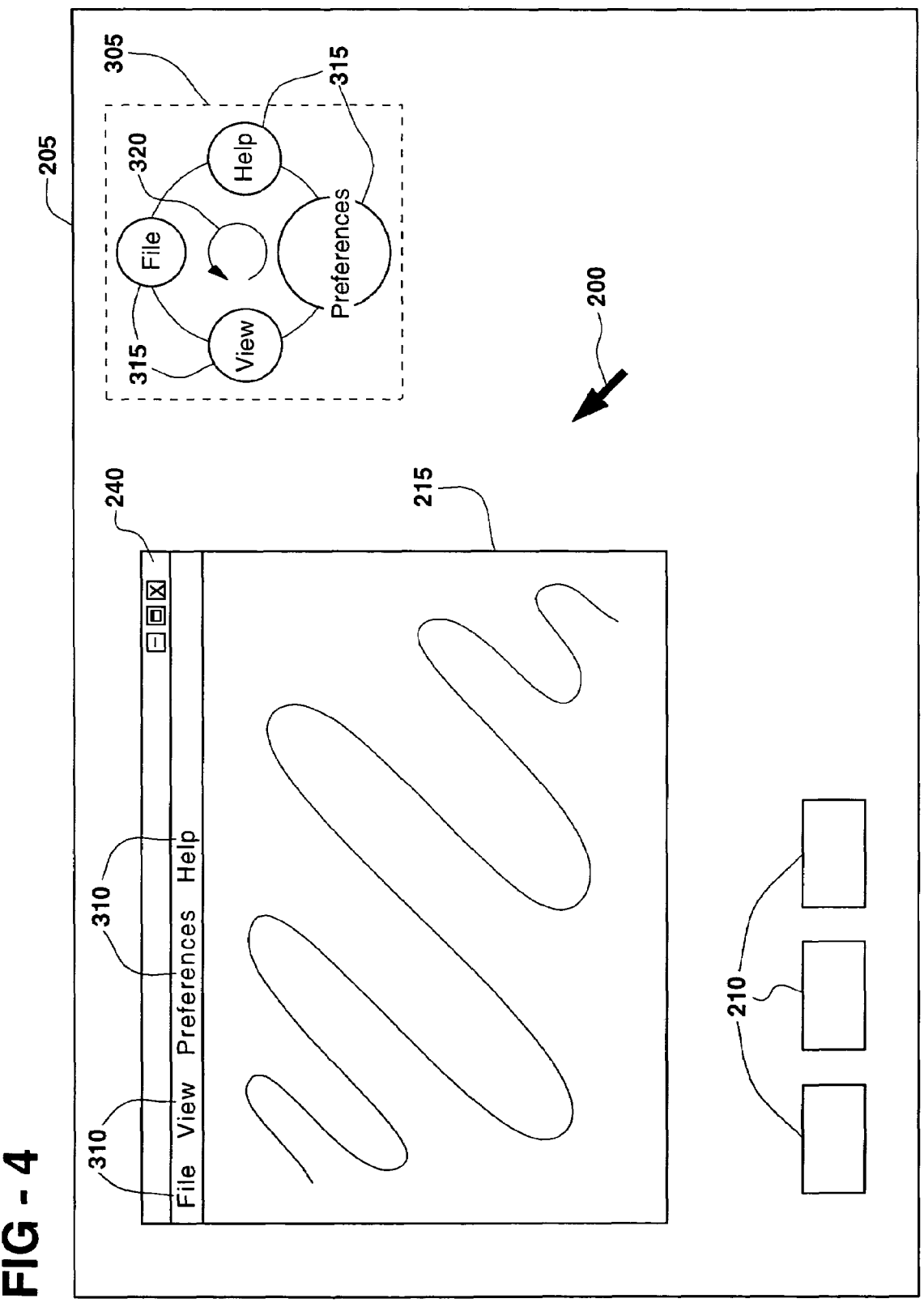
FIG. 4 illustrates a preferred embodiment of the present invention employed on a desktop similar to that of FIG. 3.

Referring now to FIG. 4, an illustration of the desktop 205 employing the present invention is shown. Reference numerals or letters in FIG. 4 which are like, similar, or identical to the reference numerals or letters of FIGS. 1–3 indicate like, similar, or identical components or features. Portion 305 of desktop 205, designated by the dashed line, is a preferred embodiment of the present invention. Desktop 205 includes cursor 200, icons 210, window 215 further comprising title bar 240 and options 310. Options 310 are functions available to the user from the underlying application running in window 215. Included in portion 305 of desktop 205 are a series of targets 315 that are representations, according to the present invention, of the underlying options 310 offered by the application running in window 215. Arrow 320 is intended to indicate the counterclockwise cycling, or rotating, of targets 315. The implementation of the above preferred embodiment according to the present invention is presented in greater detail below.

Figure 5:
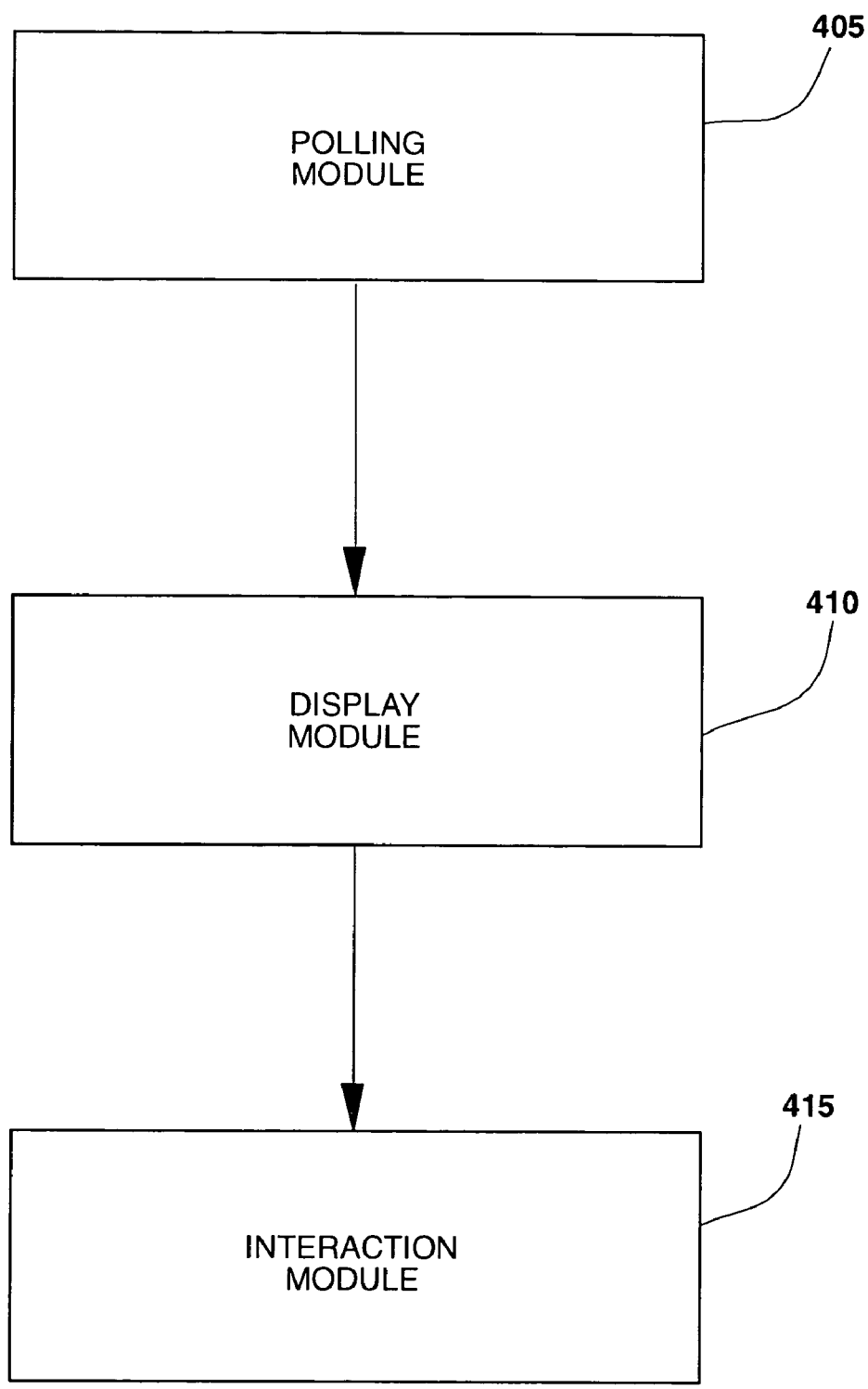
FIG. 5 is a block diagram illustrating the implementation of the present invention according to a preferred embodiment.

Referring now to FIG. 5, a block diagram illustrating the implementation of the present invention is shown. Reference numerals or letters in FIG. 5 which are like, similar, or identical to the reference numerals or letters of FIGS. 1–4 indicate like, similar, or identical components or features. As can be seen, the big picture implementation of the present invention is comprised of three modules. The first module, Polling Module 405, monitors any applications running on information handling system 100. The second module, Display Module 410, is responsible for creating the targets from the list of options obtained by Polling Module 405 and for displaying and animating, or cycling, targets 315 on the display of monitor 175. Interaction Module 415, the third module, is responsible for monitoring portion 305 of desktop 205 for the presence and/or signals of cursor 200 and executing the appropriate commands as a result of these signals. Further details for implementing each of the above modules is included in the following paragraphs.

Figure 6:
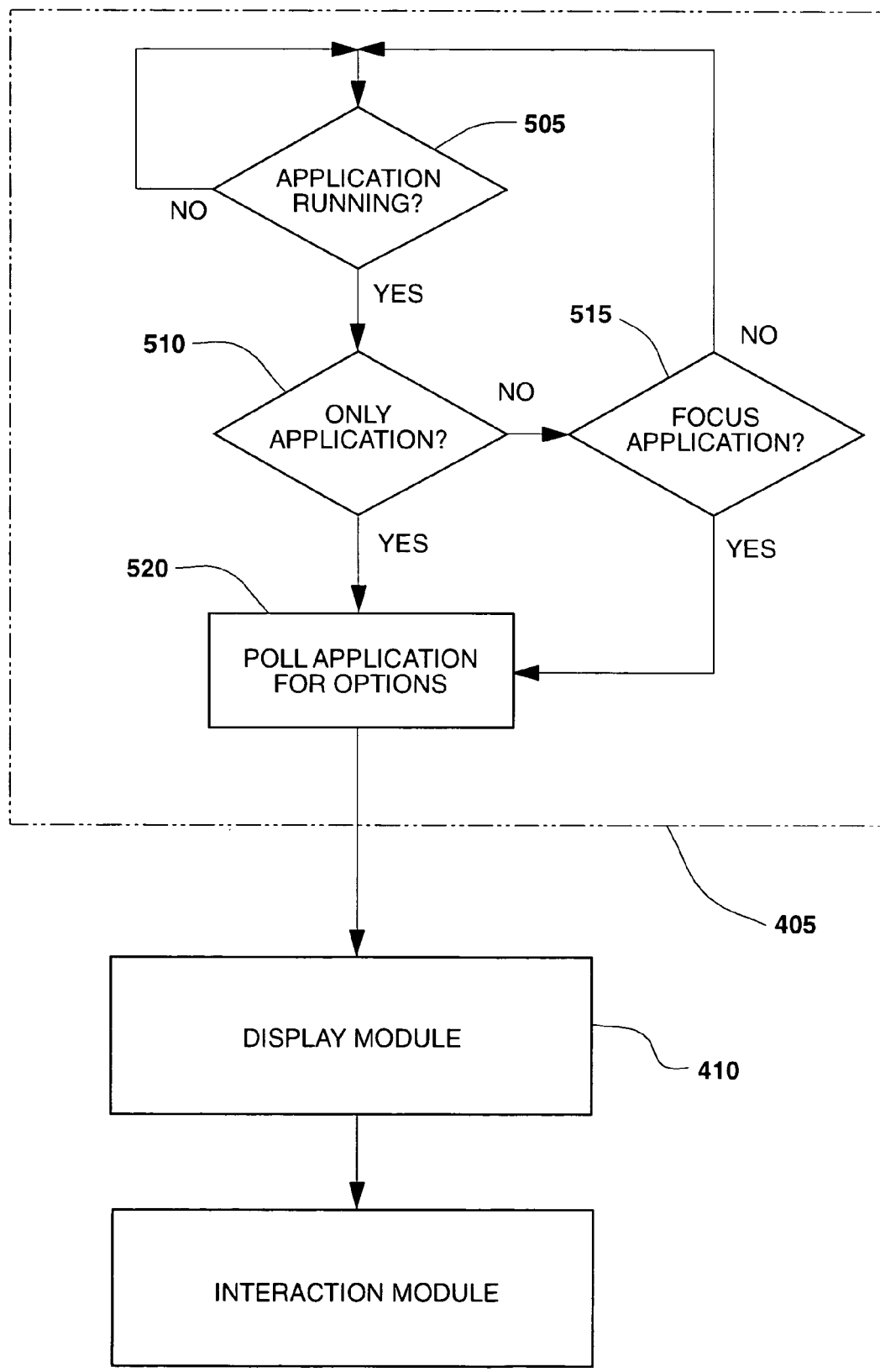
FIG. 6 is a block diagram illustrating the implementation of a Polling Module of FIG. 5 according to a preferred embodiment of the present invention.

Referring now to FIG. 6, a block diagram illustrating the details of Polling Module 405 is shown. Reference numerals or letters in FIG. 6 which are like, similar, or identical to the reference numerals or letters of FIGS. 1–5 indicate like, similar, or identical components or features. As mentioned above, Polling Module 405 is responsible for monitoring information handling system 100 for running applications. Once information handling system 100 is ready to run applications, i.e., once the operating system has loaded, the present invention can be launched as an application running on information handling system 100. As can be seen in FIG. 5, Polling Module 405 begins with sub-module 505 which checks information handling system 100 for running applications and continues to do so until an application is launched or found to be running. Once sub-module 505 has detected an application running, sub-module 510 verifies that this is the only application running 510. If sub-module 510 determines this application to be the only application running, it then passes control to sub-module 520. If sub-module 510 determines that more than one application is currently running, sub-module 515 is then given control to determine whether this application is the application with the focus, i.e., the application that is accepting user input at this moment in time, or it is an application that is running in the background to the focused application. If sub-module 515 determines that the application in question is not the focused application, control is then passed back to sub-module 505 for it to monitor information handling system 100 again and provide another application to be verified. However, if sub-module 515 determines that the application in question is the focused application, control is then passed to sub-module 520. Sub-module 520 will interface with the application to compile a set of information about the focused application. Sub-module 520 will poll the focused application for a list of underlying options 310 available to the user and for any additional information regarding each option 310 that could be used to better explain the application's underlying options 310. Once sub-module 520 has compiled all of the requested information, the set of information as well as control are passed to Display Module 410.

Referring now to FIG. 7, a block diagram illustrating the details of Display Module 410 is shown. Reference numerals or letters in FIG. 7 which are like, similar, or identical to the reference numerals or letters of FIGS. 1–6 indicate like, similar, or identical components or features. Once Display Module 410 obtains the set of options 310 and additional information from Polling Module 405 in step 450, the next step taken in step 452 is to create a target 315 to represent each option 310 available to the user. Once a set of targets 315 is created, Display Module 410 then creates a structure for the targets 315 to occupy in step 454. For instance, if targets 315 are spheres, a structure that could be created is a ring. The spheres would then occupy or form this ring structure as illustrated in FIG. 4. With targets 315 now placed into a structure, Display Module 410 then projects, or displays, the structure and targets 315 on monitor 175 in step 456. Once the structure and targets 315 are displayed on monitor 175, Display Module 410 is then responsible for animating, or cycling, the structure and targets 315 to make them appear to be rotating in step 458. To further illustrate, picture the ring of targets 315 in FIG. 4 spinning around an axis located in the center of the ring. Also as illustrated in FIG. 4, and denoted by step 460, the targets are displayed in such a way that they vary in size as they cycle about an imaginary axis. The intention of this cycling and variance of size is to give the combined effect of a three-dimensional rotating ring. Once targets 315 are displayed and cycling, Display Module 410, while maintaining the current display until an updated set of options 310 is received from Polling Module 405 in step 462, then signals Interaction Module 415 to take over.

Referring now to FIG. 8, a block diagram illustrating the details of Interaction Module 415 is shown. Reference numerals or letters in FIG. 8 which are like, similar, or identical to the reference numerals or letters of FIGS. 1–7 indicate like, similar, or identical components or features. Upon receipt of a signal from Display Module 410, Interaction Module 415 begins its duties by creating a "hotspot" in the area of the cycling display in step 850. This hotspot is designed to give only a certain portion of this cycling three-dimensional menu the ability to access user input. In a preferred embodiment, each target 315 is configured as a separate hotspot. Illustratively, as each target 315 rotates and changes size as a part of the 3-D display process, so does its corresponding hotspot, making each target 315 selectable whether in the foreground or background of the 3-D display. Any mouse signals, whether clicking or hovering, in portion 305 comprising this three-dimensional display would be processed only if they occurred in an area configured to act as a hotspot, i.e., on one of the targets 315. If Interaction Module 415 detects cursor 200 in step 852 and a mouse 150 click (step 854) in a hotspot, it will then launch the option 310 represented by the target 315 in contact with cursor 200 at the moment the clicking signal was generated, as denoted in step 856. Interaction Module 415 is further configured in step 858 to detect cursor 200 hovering over a hotspot and will then display the additional information associated with the option 310 represented by the target 315 in contact with cursor 200 at that moment in time. If mouse 150 clicks or cursor 200 hovering occur in any other area of the three-dimensional display, they are ignored by the system and no action results. Alternatively, the concept of the hotspot mentioned herein parallels the discussion of FIG. 3 involving windows 215 and 220 having the focus. Further illustration of the hotspot approach is contained in the paragraphs that follow.

Figure 9A:
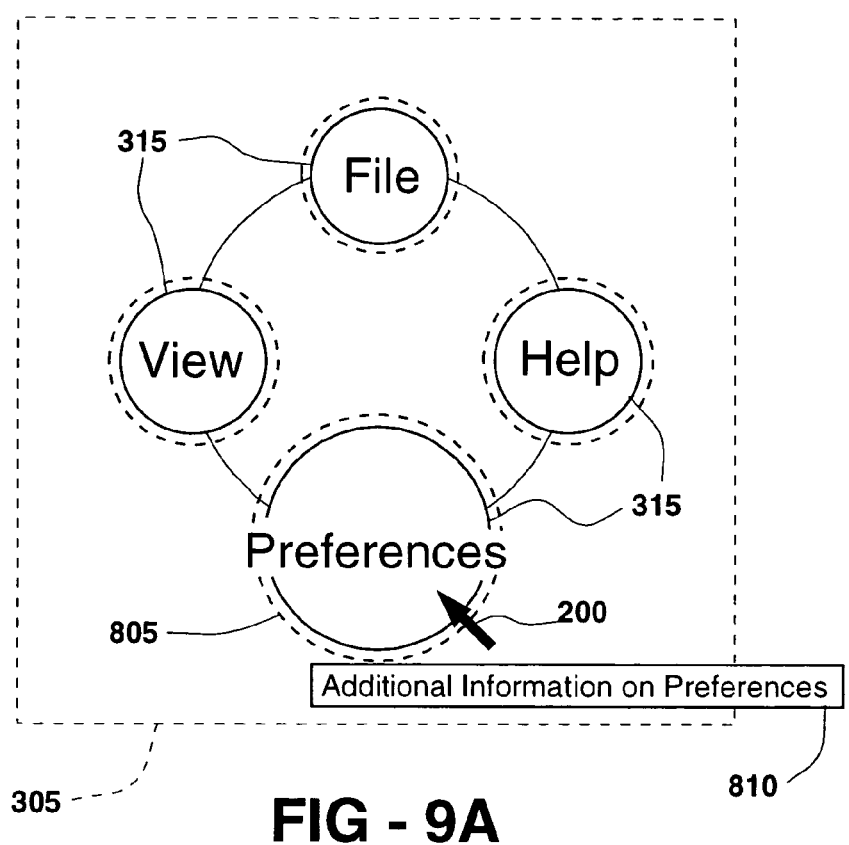
FIGS. 9A and 9B illustrate the functionality of a Hotspot employed by the present invention according to a preferred embodiment.
Figure 9B:
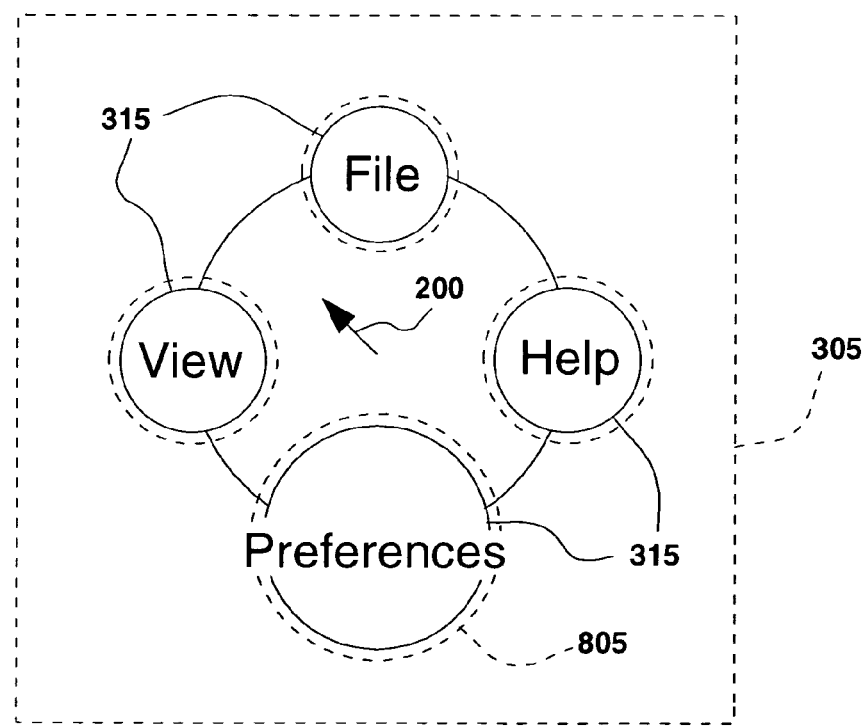

Referring now to FIGS. 9A and 9B, illustrations of the present invention's implementation of the hotspot are shown. Reference numerals or letters in FIGS. 9A and 9B which are like, similar, or identical to the reference numerals or letters of FIGS. 1–8 indicate like, similar, or identical components or features. FIG. 9A illustrates portion 305 of the display with targets 315 cycling about an imaginary axis (not shown) in between the shown targets 315. Also illustrated in FIG. 9A is the "Preferences" hotspot 805 as configured and implemented by Interaction Module 415. The dotted line indicates the boundaries of hotspot 805 within which is the area where the system will accept signals resulting from mouse 150 clicks and/or cursor 200 hovering. Dialog box 810 indicates the intended response to cursor 200 hovering over while target 315 and cursor 200 are within the boundaries of hotspot 805. Dialog box 810 will typically include additional information concerning option 310 represented by target 315 currently within the hotspot's 805 boundaries. FIG. 9B also illustrates portion 305 of the display with targets 315 cycling about an imaginary axis through the center of targets 315. Also illustrated in FIG. 9B is hotspot 805 as configured and implemented by Interaction Module 415. As previously mentioned, the dotted line indicates the boundaries of hotspot 805 within which is the area where the system will accept signals resulting from mouse 150 clicks and/or cursor 200 hovering. Similar hotspots are indicated by the dotted lines on the remaining targets 315 indicating their continual selectability. Cursor 200 in FIG. 9B is hovering over portion 305, just as in FIG. 9A. However, since the cursor 200 is not within the boundaries of hotspot 805, no dialog box 810 appears.

Figure 10B:
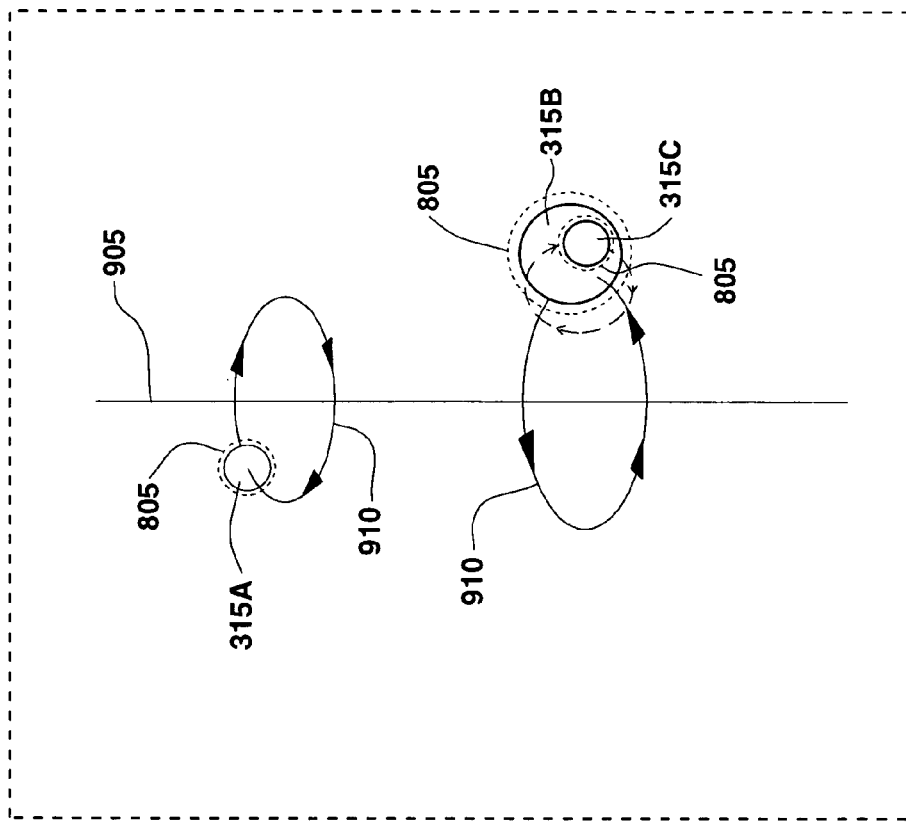
FIGS. 10A and 10B illustrate different methods for implementing three-dimensional functionality and complex hierarchical menus according to a preferred embodiment of the present invention.
Figure 10A:
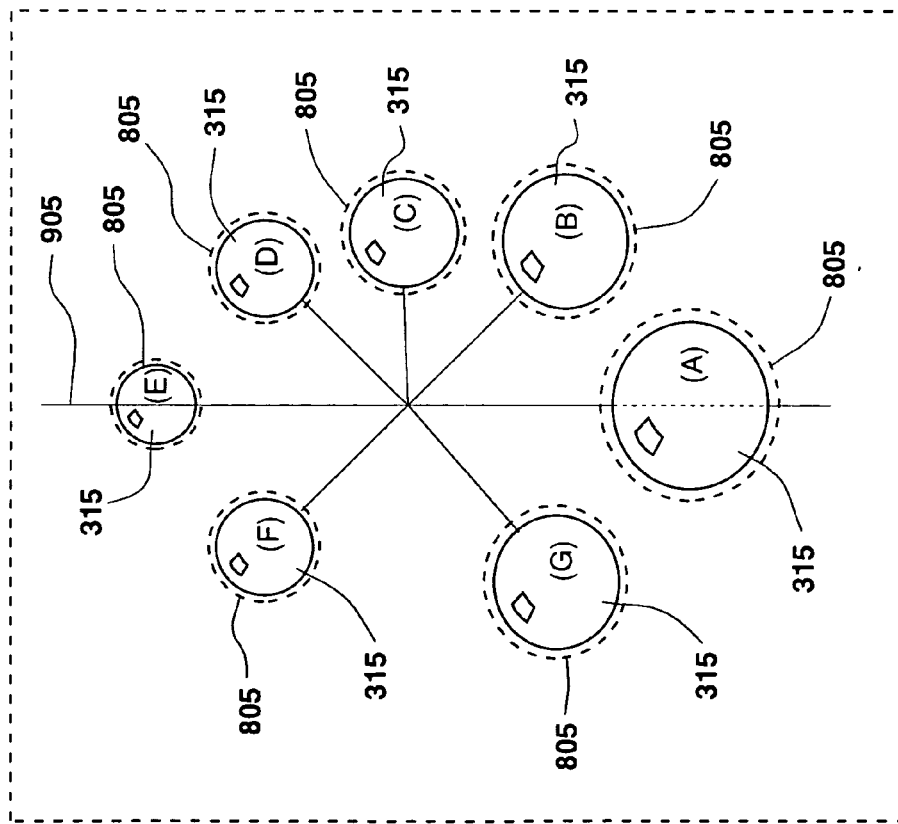

Referring now to FIGS. 10A and 10B, various representations of three-dimensional effects about axes 905 are illustrated. Reference numerals or letters in FIGS. 10A and 10B which are like, similar, or identical to the reference numerals or letters of FIGS. 1–9B indicate like, similar, or identical components or features. FIG. 10A illustrates all of the concepts detailed herein concerning the display of targets 315. As can be seen, portion 305 comprises axis 905 about which targets 315 cycle. Each representation of target 315 is consecutively labeled with a letter from (A) to (G) intended to illustrate the desired change in size of target 315 and its corresponding hotspot as it cycles about axis 905 from point (A), the foreground, around through point (G), back to point (A) and continuing as long as the present invention is employed. It can also be discerned from FIG. 10A that target 315 is selectable at all times due to the fact that each target is located within a selectable hotspot 805 boundary. It is understood by persons of ordinary skill in the art that the hotspots may be designed to correspond directly with a specific target 315, and that each corresponding hotspot may move in conjunction with the movement of each target 315.

An alternate representation is illustrated in FIG. 10B. FIG. 10B also illustrates a compact and easily interpreted method by which a more elaborate series of options can be displayed by employing the present invention. As before, all targets 315 cycle about axis 905. Targets 315A and 315B make clear rotations about axis 905 as indicated by the solid lined circular arrows 910 which, in this situation, happens to be in opposite directions. Note target 315C which is cycling about target 315B while at the same time cycling about axis 905. Target 315C illustrates one alternative which is capable of displaying the sub-menus of a hierarchical menu system according to a preferred embodiment of the present invention. This approach may be designed to allow selectability of target 315C while it is shown in a manner to indicate that it is behind target 315B, or it may be designed to only allow selectability when target 315C rotates back around and in front of target 315B.

Before explaining the Cursor Hotspot Recognition portion of the present invention, the background of target highlighting needs to be explained. Selectable options and targets are common in any system or user interface which utilizes a cursor 200 and a cursor control device such as mouse 150, a trackball integrated into remote 215 or keys included on both keyboard 145 and remote 215 for user input. Along with selectable options and the cursor 200 comes additional functionality that is traditionally interpreted to be a part of cursor 200. This additional functionality is known as highlighting. To aid user interface users in an image intense environment, user interfaces will typically create a highlighting effect on objects in the display space when those objects themselves are selectable and those objects are in contact with cursor 200. Standard highlighting effects include enlarging the object, changing the object's color, and animating the object, all while keeping cursor 200 in its default, traditionally an arrow, form. Although user interfaces do include cursor 200 shape changes, the shape changes are typically for performing different modes of action, i.e., obtaining help, resizing objects, wait periods, no options available, typing some text, etc.

With an understanding of a traditional user interface's implementation of highlighting in mind, it is now possible to detail the implementation of the present invention. To begin, the present invention employs the same means traditional user interfaces employ for determining whether or not cursor 200 is in contact with a selectable option. For clarity, it should be mentioned that cursor 200 can be moved onto a selectable option, or in the case of animated menus, a selectable option can move into contact with a static cursor 200. Continuing, by employing the same means traditional user interfaces employ to determine whether or not cursor 200 is in contact with a selectable option, the present invention is initiated once a determination is made that cursor 200 is indeed in contact with a selectable option. Once this determination is made, the present invention first acquires the file name, location, and other important information concerning the image file that is being displayed as the selectable option. To further explain, selectable options are typically displayed as images, and therefore, there is an image file associated with each selectable option. The typical file format for a selectable option is a *.ico format. However, it is possible that *.bmp, *.jpg, and other formats could also be used. With this list of information acquired, the present invention can then begin the process of cursor 200 change.

The first stage of cursor 200 change involves accessing the location in memory which houses the image file of the selectable option. Once the image file has been accessed, the present invention will then proceed to resize the image. For example, if the selectable option is normally displayed in a 60×40 pixel size, the present invention could choose to use a 25% representation, or 15×10 pixel size, as the image size to be displayed as cursor 200. Once the image file has been accessed and the image resized, the present invention then swaps the current cursor 200 image file, i.e., the arrow image file, for the resized image file representative of the selectable option, and thus the displayed cursor 200 is changed accordingly. This image file swap is possible due to the fact that both the displayed cursor 200 and the displayed selectable option are generated from image files located in the memory of information handling system 100. This miniature of the selectable option will then be displayed as cursor 200 as long as cursor 200 is in contact with that particular selectable option. At the point cursor 200 and the selectable option lose contact, cursor 300 will revert back to its original shape, i.e., the arrow.

In its preferred embodiment, the present invention is utilized with the animated three-dimensional menus detailed above. These animated menus can be obtained from video sources, animated sources, or any other source capable of displaying the desired effects in the displayed menu. Due to the fact that these animated three-dimensional menus contain objects that are constantly in motion and are constantly changing shape, size, and color as they move about the display, traditional highlighting methods as mentioned above would be very problematic, if not impossible, to implement and utilize. Adding further changes in shape, size, and color to an already dynamic object in the presence of cursor 200 would present great difficulty to a programmer. Therefore, by changing the shape of cursor 200 to highlight a selectable option as opposed to changing an aspect of the animated menu or the selectable option such as color, shape, or size, the system's 100 resources are more efficiently utilized, and algorithm coding for highlighting effects is greatly simplified.

Figure 11B:
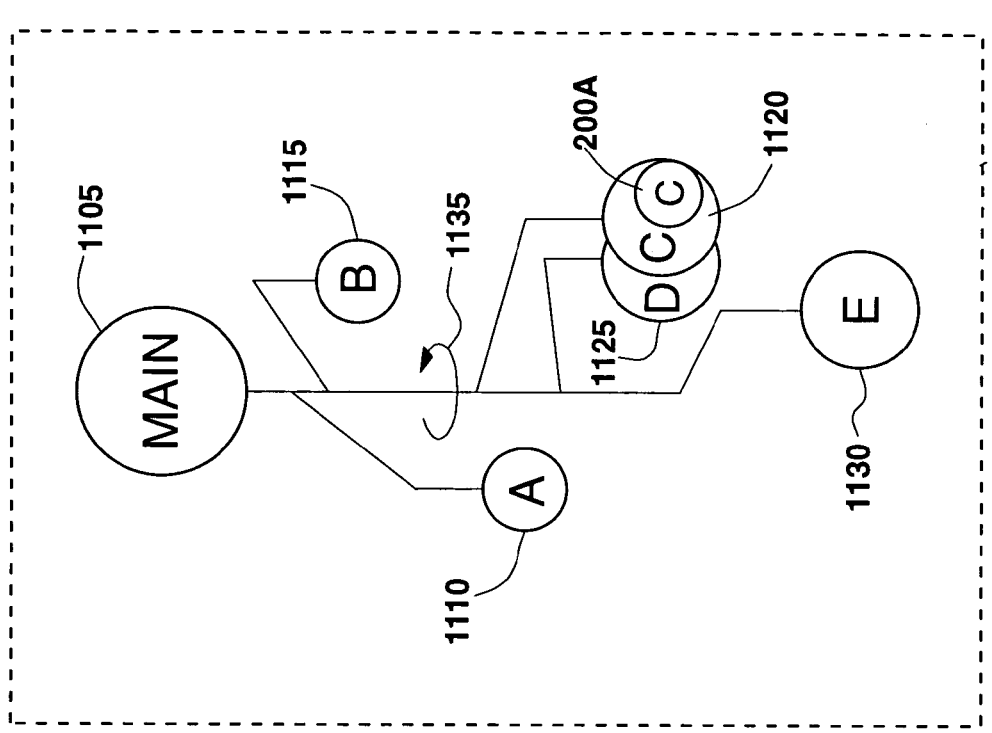
FIGS. 11A and 11B illustrate a before and after view of a preferred response of the Cursor Hotspot Recognition portion of the present invention according to a preferred embodiment.
Figure 11A:
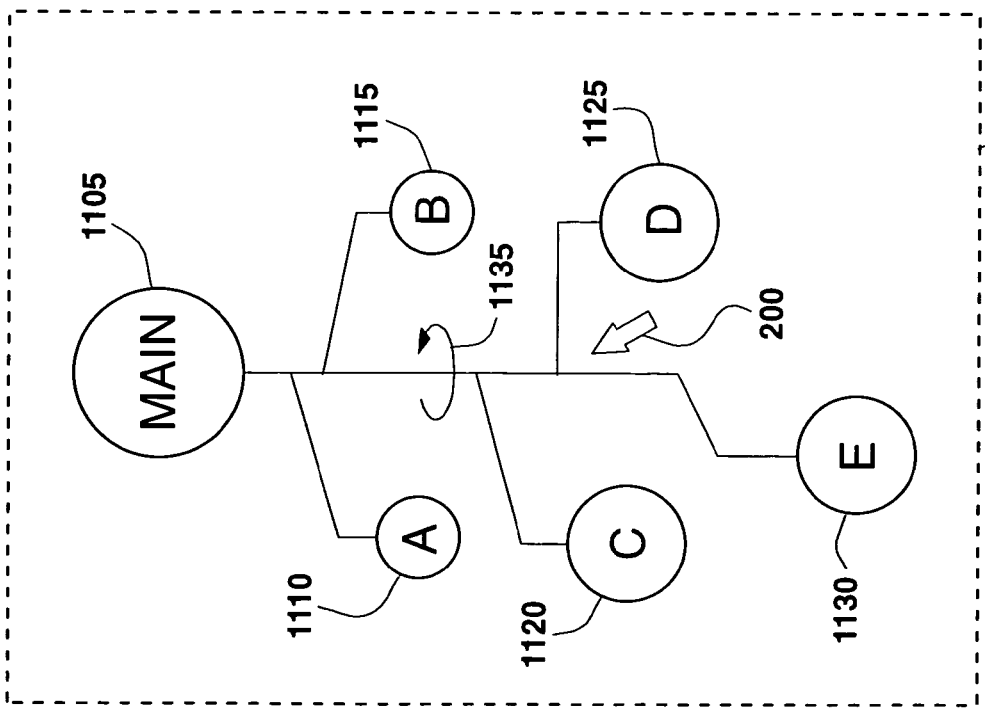

Referring now to FIGS. 11A and 11B in which a preferred response according to a preferred embodiment of the present invention is illustrated. Reference numerals or letters in FIGS. 11A and 11B which are like, similar, or identical to the reference numerals or letters of FIGS. 1–10B indicate like, similar, or identical components or features. Dashed line 1100 is representative of a portion of desktop 305 containing an animated three-dimensional menu system. Targets, or selectable options 1110, 1115, 1120, 1125 and 1130, are all options under main menu 1105. Arrow 1135 indicates the direction of motion of the animated display. In FIG. 11A, cursor 200 is within the boundaries of the animated display, but it is not within the boundaries of any hotspots corresponding to any of selectable options 1110, 1115, 1120, 1125 or 1130. As the animated menu continues to rotate, target 1120 rotates in such a way that it comes into contact with cursor 200. FIG. 11B illustrates the desired cursor 200A change implemented by the present invention. Cursor 200A, as illustrated, is a miniature version of target 1120, including a miniature of the "C" label present on target 1120.

Figure 12:
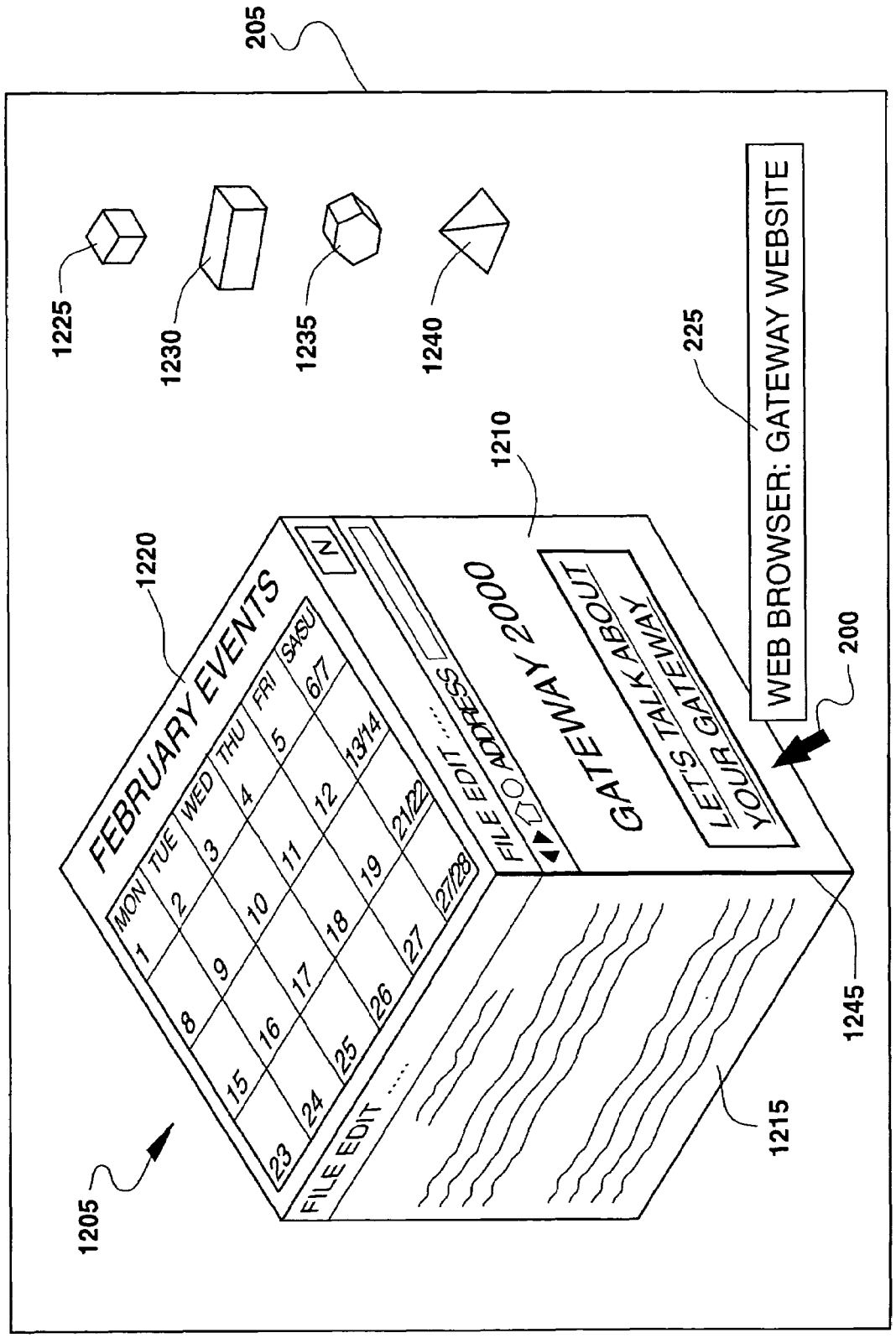
FIG. 12 illustrates an alternative embodiment of the present invention.

Referring now to FIG. 12, an alternate embodiment of the present invention is illustrated. Reference numerals or letters in FIG. 12 which are like, similar, or identical to the reference numerals or letters of FIGS. 1–11B indicate like, similar, or identical components or features. As illustrated in FIG. 12, the present invention can be employed utilizing virtually any polygonal shape. Target 1205 is configured as a cube. Additional target polygonal shapes and styles are represented, in a minimized form, by vertical rectangle target 1225, horizontal rectangle target 1230, hexagonal target 1235, and pyramidal target 1240. The present invention, however, is not limited to perfect polyhedrons.

Target 1205 is further configured such that each of its six faces is capable of presenting an application's interface to a user. For example, side 1210 of target 1205 contains a web browser window, side 1215 of target 1205 contains a word processing document and word processing interface, and side 1220 of target 1205 contains a calendar application's user interface. The remaining three sides of target 1205 are not visible at this point of the target's 1205 rotation. It is possible for the sides of target 1205 to be created by utilizing screen captures of the associated applications. Screen captures are preferred over the use of icons due to the fact that screen captures display a more familiar interface to the user as well as present a more pleasant operating environment.

Additional functionality incorporated into the present invention includes allowing the user to determine the characteristics of a given target. For example, in addition to allowing a user to choose the applications represented by any given target, the user can also be given a choice as to what shape polygon they desire their chosen applications to be presented on. Further user configuration is allowed by giving the user the ability to resize any given polygon or any side of a given polygon. For example, a user can select edge 1245 of target 1205 and force side 1210, or side 1215, to become larger or smaller, depending on the user's preferences. This functionality allows a user to give more emphasis to a given side or it can be utilized to create more workspace for the user when interacting with the chosen side. The user is also able to select the speed and path of cycling should they so desire.

Each target displayed on desktop 205 can be further defined to represent a specific applications group. For example, vertical rectangle target 1225 can be configured such that it displays the applications preferred by the current user. That is, when a different user logs onto the current system, vertical rectangle target 1225 may not be displayed. Target 1240 could be defined as "Desktop" applications, etc. Another possibility makes target 1230 represent six documents opened in a word processor, for example. Other embodiments are intended to be covered by the scope of the present invention.

As mentioned above, the targets displayed on desktop 205 are configured to cycle or rotate. This rotation can involve an entire target cycling as well as targets or items within larger targets cycling. A user is provided an on/off option which can stop, or pause, the motion of the targets to allow the user to define a side, change an application presented on a side, work within one of the applications displayed on a side, or facilitate any other change desired.

The applications presented on each side of the targets displayed on desktop 205 are further configured to be continuously accessible. For example, the user can, without utilizing the on/off option mentioned above, select the underlined link or hotspot available on side 1210 of target 1205. By selecting this link, the web browser presented on side 1210 would react as any traditionally presented, i.e., full screen, web browser would be expected to react. The same capability can be included in minimized targets 1225, 1230, 1235, and 1240.

In summary, the present invention provides a three-dimensional menu system that continuously presents all available options to a user. Further, the options, or hotspots, in the menu are continuously selectable. The items are easily accessed and discerned when in the foreground of the three-dimensional display and more difficult to discern and pinpoint in the background of the three-dimensional display. The idea is to display all the available options to a user without requiring any user interaction. In addition, the idea is to reduce the amount of time a user must wait to select an option. Minimizing wait time is facilitated by configuring all of the displayed targets to be selectable at all times, i.e., whether in the foreground or in the background.

Further, the present invention presents an improved method for a user interface to identify hotspots or selectable options. Display and cursor management, currently available for both static and moving cursors, is employed to implement the present invention. In the present invention, when cursor 200 comes into contact with a selectable option, the user interface is designed to access the image file of that selectable option and then display that image file, in reduced size, as cursor 200. For example, if the selectable target is a sphere labeled "C", cursor 200, typically an arrow, would be changed to a miniature sphere 200A including a miniature "C" label, as shown in FIG. 11B.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 115 of one or more computer or information handling systems configured generally as described in FIGS. 1–12. Until required by the computer system, the set of instructions may be stored in another computer readable memory, such as in a hard disk drive, or in a removable memory such as an optical disk for eventual use in a CD-ROM drive, or a floppy disk for eventual use in a floppy disk drive. Further, the set of instructions can be stored in the memory of another computer or encoded or embodied in a signal, such as an analog or digital signal, embodied in a propagation medium and transmitted over the propagation medium by a user. The propagation medium may include a local area network or a wide area network, such as the Internet, or other propagation medium. One skilled in the art would appreciate that the physical storage or encoding of the sets of instructions physically changes the medium upon which it is stored or encoded electrically, magnetically, or chemically so that the medium carries computer readable instructions and other information. The invention is limited only by the following claims and their equivalents.

What is claimed is:

1. A user interface comprising:
a display;
a cursor capable of being displayed on said display;
a cursor control device capable of controlling said cursor's position and movement on said display;
at least two selectable targets displayed on at least a portion of said display; and all of said at least two selectable targets displayed on said at least a portion of said display capable of being simultaneously displayed in a simulated rotation about an axis while each one of said all of said at least two selectable targets displayed on said at least a portion of said display remains continuously selectable during said simulated rotation.

2. The user interface, as defined in claim 1, wherein said interface is capable of varying the displayed size of said targets during said simulated rotation about said axis.

3. The user interface, as defined in claim 1, wherein each of said targets are associated with a corresponding function capable of being performed in response to selection of said targets by a user via said cursor and said cursor control device.

4. The user interface, as defined in claim 3, wherein said interface is capable of displaying additional information, on at least a portion of said display, associated with a specific target when said cursor is positioned at least partially within said specific target's hotspot boundary.

5. The user interface, as defined in claim 3, wherein said interface is capable of modifying said targets being displayed on said display in response to a change in focus on content being displayed in another portion of said display.

6. The user interface, as defined in claim 1, wherein said interface is capable of displaying said simulated rotation of said targets about said axis in a simulated three-dimensional presentation.

7. The user interface, as defined in claim 6, wherein said interface is capable of providing focus to a specific target in response to said cursor being positioned at least partially within said specific target's hotspot boundary.

8. The user interface, as defined in claim 1, wherein said cursor is capable of modifying its presentation into a shape similar to the shape of a specific target which is being given focus by said cursor.

9. The user interface, as defined in claim 8, wherein the modification in the presentation of said cursor further comprises changing the shape of said cursor into a shape similar to a miniature version of the shape of said specific target.

10. The user interface, as defined in claim 1, wherein said targets are displayed as an animated sequence of movement.

11. The user interface, as defined in claim 1, wherein each of said at least two selectable targets is presented as a polygonal shaped target.

12. The user interface, as defined in claim 11, wherein said polygonal shaped target is capable of displaying content on each of its user-visible sides.

13. The user interface, as defined in claim 1, wherein said targets are capable of remaining visible as said targets travel in a simulated rotation about said axis.

14. The user interface of claim 1, wherein said simulated rotation is a 360 degree revolution in a substantially circular orbit about said axis.

15. The user interface of claim 1, wherein said all of said at least two selectable targets are located at different points along a common orbit about said axis during said simulated rotation.

16. The user interface of claim 1, wherein two or more of said at least two selectable targets are located in different orbits about said axis during said simulated rotation.

17. The user interface of claim 16, wherein said different orbits are located in parallel planes.

18. The user interface of claim 1, wherein said axis substantially lies within a plane of a screen of said display.

19. The user interface of claim 1, wherein said axis is substantially normal to a plane of a screen of said display.

20. A system comprising:
  at least one processor;
  memory operably associated with said processor; and
  a user interface, said user interface comprising
  a display;
  a cursor capable of being displayed on said display;
  a cursor control device capable of controlling said cursor's position and movement on said display;
  at least two selectable targets displayed on at least a portion of said display; and all of said at least two selectable targets displayed on said at least a portion of said display capable of being simultaneously displayed in a simulated rotation about an axis while each one of said all of said at least two selectable targets displayed on said at least a portion of said display remains continuously selectable during said simulated rotation.

21. The system, as defined in claim 20, wherein said interface is capable of varying the displayed size of said targets during said simulated rotation about said axis.

22. The system, as defined in claim 20, wherein each of said targets are associated with a corresponding function capable of being performed in response to selection of said targets by a user via said cursor and said cursor control device.

23. The system, as defined in claim 22, wherein said interface is capable of displaying additional information, on at least a portion of said display, associated with a specific target when said cursor is positioned at least partially within said specific target's hotspot boundary.

24. The system, as defined in claim 22, wherein said interface is capable of modifying said targets being displayed on said display in response to a change in focus on content being displayed in another portion of said display.

25. The system, as defined in claim 20, wherein said interface is capable of displaying said simulated rotation of said targets about said axis in a simulated three-dimensional presentation.

26. The system, as defined in claim 25, wherein said interface is capable of providing focus to a specific target in response to said cursor being positioned at least partially within said specific target's hotspot boundary.

27. The system, as defined in claim 20, wherein said cursor is capable of modifying its presentation into a shape similar to the shape of a specific target which is being given focus by said cursor.

28. The system, as defined in claim 27, wherein the modification in the presentation of said cursor further comprises changing the shape of said cursor into a shape similar to a miniature version of the shape of said specific target.

29. The system, as defined in claim 20, wherein said targets are displayed as an animated sequence of movement.

30. The system, as defined in claim 20, wherein each of said at least two selectable targets is presented as a polygonal shaped target.

31. The system, as defined in claim 30, wherein said polygonal shaped target is capable of displaying content on each of its user-visible sides.

32. The system, as defined in claim 20, wherein said targets are capable of remaining visible as said targets travel in a simulated rotation about said axis.

33. The system of claim 20, wherein said simulated rotation is a 360 degree revolution in a substantially circular orbit about said axis.

34. The system of claim 20, wherein said all of said at least two selectable targets are located at different points along a common orbit about said axis during said simulated rotation.

35. The system of claim 20, wherein two or more of said at least two selectable targets are located in different orbits about said axis during said simulated rotation.

36. The system of claim 35, wherein said different orbits are located in parallel planes.

37. The system of claim 20, wherein said axis substantially lies within a plane of a screen of said display.

38. The system of claim 20, wherein said axis is substantially normal to a plane of a screen of said display.

39. A computer readable medium tangibly embodying a program of instructions capable of implementing the following steps:
  displaying at least two selectable targets on at least a portion of a display, all of said at least two selectable targets displayed on said at least a portion of said display capable of being simultaneously displayed in a simulated rotation about an axis while each one of said all of said at least two selectable targets displayed on said at least a portion of said display remains continuously selectable during said simulated rotation.

40. The computer readable medium, as defined in claim 39, being capable of further implementing the step of varying the displayed size of said targets during said simulated rotation about said axis.

41. The computer readable medium, as defined in claim 39, being capable of further implementing the step of associating each of said targets with a corresponding function capable of being performed in response to selection of said targets by a user via a cursor and a cursor control device.

42. The computer readable medium, as defined in claim 41, being capable of further implementing the step of displaying additional information, on at least a portion of the display, associated with a specific target when said cursor is positioned at least partially within said specific target's hotspot boundary.

43. The computer readable medium, as defined in claim 41, being capable of further implementing the step of modifying said targets being displayed on said display in response to a change in focus on content being displayed in another portion of said display.

44. The computer readable medium, as defined in claim 39, being capable of further implementing the step of displaying said simulated rotation of said targets about said axis in a simulated three-dimensional presentation.

45. The computer readable medium, as defined in claim 44, being capable of further implementing the step of providing focus to a specific target in response to said cursor being positioned at least partially within said specific target's hotspot boundary.

46. The computer readable medium, as defined in claim 45, being capable of further implementing the step of modifying said cursor's presentation into a shape similar to the shape of a specific target which is being given focus by said cursor.

47. The computer readable medium, as defined in claim 46, being capable of further implementing the step of modification such that said cursor's presentation further comprises changing the shape of said cursor into a shape similar to a miniature version of the shape of said specific target.

48. The computer readable medium, as defined in claim 39, being capable of further implementing the step of displaying said targets as an animated sequence of movement.

49. The computer readable medium, as defined in claim 39, wherein each of said at least two selectable targets is presented as a polygonal shaped target.

50. The computer readable medium, as defined in claim 49, wherein said polygonal shaped target is capable of displaying content on each of its user-visible sides.

51. The computer readable medium, as defined in claim 39, being capable of further implementing the step of keeping said targets visible as said targets travel in a simulated rotation about said axis.

52. The computer readable medium of claim 39, wherein said simulated rotation is a 360 degree revolution in a substantially circular orbit about said axis.

53. The computer readable medium of claim 39, wherein said all of said at least two selectable targets are located at different points along a common orbit about said axis during said simulated rotation.

54. The computer readable medium of claim 39, wherein two or more of said at least two selectable targets are located in different orbits about said axis during said simulated rotation.

55. The computer readable medium of claim 54, wherein said different orbits are located in parallel planes.

56. The computer readable medium of claim 39, wherein said axis substantially lies within a plane of a screen of said display.

57. The computer readable medium of claim 39, wherein said axis is substantially normal to a plane of a screen of said display.

58. A method comprising the following steps:
displaying at least two selectable targets on at least a portion of a display, all of said at least two selectable targets displayed on said at least a portion of said display capable of being simultaneously displayed in a simulated rotation about an axis while each one of said all of said at least two selectable targets displayed on said at least a portion of said display remains continuously selectable during said simulated rotation.

59. The method, as defined in claim 58, further implementing the step of varying the displayed size of said targets during said simulated rotation about said axis.

60. The method, as defined in claim 58, further implementing the step of associating each of said targets with a corresponding function capable of being performed in response to selection of said targets by a user via a cursor and a cursor control device.

61. The method, as defined in claim 60, further implementing the step of displaying additional information, on at least a portion of the display, associated with a specific target when said cursor is positioned at least partially within said specific target's hotspot boundary.

62. The method, as defined in claim 60, further implementing the step of modifying said targets being displayed on said display in response to a change in focus on content being displayed in another portion of said display.

63. The method, as defined in claim 58, further implementing the step of displaying said simulated rotation of said targets about said axis in a simulated three-dimensional presentation.

64. The method, as defined in claim 63, further implementing the step of providing focus to a specific target in response to said cursor being positioned at least partially within said specific target's hotspot boundary.

65. The method, as defined in claim 64, further implementing the step of modifying said cursor's presentation into a shape similar to the shape of a specific target which is being given focus by said cursor.

66. The method, as defined in claim 65, further implementing the step of modification such that said cursor's presentation further comprises changing the shape of said cursor into a shape similar to a miniature version of the shape of said specific target.

67. The method, as defined in claim 58, further implementing the step of displaying said targets as an animated sequence of movement.

68. The method, as defined in claim 58, wherein each of said at least two selectable targets is presented as a polygonal shaped target.

69. The method, as defined in claim 68, wherein said polygonal shaped target is capable of displaying content on each of its user-visible sides.

70. The method, as defined in claim 58, further implementing the step of keeping said targets visible as said targets travel in a simulated rotation about said axis.

71. The method of claim 58, wherein said simulated rotation is a 360 degree revolution in a substantially circular orbit about said axis.

72. The method of claim 58, wherein said all of said at least two selectable targets are located at different points along a common orbit about said axis during said simulated rotation.

73. The method of claim 58, wherein two or more of said at least two selectable targets are located in different orbits about said axis during said simulated rotation.

74. The method of claim 73, wherein said different orbits are located in parallel planes.

75. The method of claim 58, wherein said axis substantially lies within a plane of a screen of said display.

76. The method of claim 58, wherein said axis is substantially normal to a plane of a screen of said display.

* * * * *